United States Patent [19]

Futakuchi et al.

[11] 4,385,952
[45] May 31, 1983

[54] PROCESS FOR PREPARING FIBER REINFORCED PLASTICS

[75] Inventors: Michio Futakuchi; Hidetoshi Kitakoga, both of Sagamihara, Japan

[73] Assignee: Mitsubishi Denki Kabushiki Kaisha, Tokyo, Japan

[21] Appl. No.: 296,876

[22] Filed: Aug. 27, 1981

[30] Foreign Application Priority Data

Aug. 27, 1980 [JP] Japan ................. 55-117947

[51] Int. Cl.³ ............................................. B65H 81/00
[52] U.S. Cl. ...................................... 156/174; 428/114
[58] Field of Search ............... 156/174, 426, 149, 175, 156/173, 172, 181, 438, 440, 393; 264/137, 157, 158; 428/107, 111, 112, 113, 114

[56] References Cited

U.S. PATENT DOCUMENTS

| | | | |
|---|---|---|---|
| 2,843,153 | 7/1958 | Young | 138/55 |
| 4,080,915 | 3/1978 | Bompard et al. | 242/7.21 |
| 4,326,905 | 4/1982 | Tanaka | 156/149 |

FOREIGN PATENT DOCUMENTS 2746290  4/1979  Fed. Rep. of Germany ...... 156/149

OTHER PUBLICATIONS

"Filament Winding", by D. V. Rosato, C. S. Grove, Jr. (John Wiley & Sons, Inc.), p. 117, lines 24–30.
Japanese Examined Publication No. 35232/1979, "Process for Preparing a Composite Material Product".
West German Pat. No. 2460808, "Verfahren zum Herstellen von Leichtbauteilen aus faserverstarktem Kunststoff".

Primary Examiner—Michael W. Ball
Attorney, Agent, or Firm—Oblon, Fisher, Spivak, McClelland & Maier

[57] ABSTRACT

A method of producing a fiber reinforced plastic product which includes the steps of winding a strand or rovings on a mandrel prepared by a filament winding method in three directions of substantially +60 degrees, −60 degrees and 0 degrees to the axis of the mandrel in desired turns to form braid fabric reinforced in three directions; impregnating a resin before or after the winding step; cutting out the resin impregnated braid fabric from the mandrel to obtain a prepreg reinforced in three directions; and fabricating the prepreg in a desired configuration for a product by heating and a fiber reinforced plastic product made by the method.

4 Claims, 7 Drawing Figures

PROCESS FOR PREPARING FIBER REINFORCED PLASTICS

BACKGROUND OF THE INVENTION

1. Field of the Invention

The present invention relates to a process for preparing a fiber reinforced plastics (hereinafter referred to as FRP). More particularly, it relates to a process for preparing FRP product which has no filament cracking, layer peeling, or non-anistropy and has excellent fabricatability with the maximum fiber reinforcing effect and the plastic product.

2. Description of the Prior Art

FRP product is especially important among composite materials in view of light weight, high strength characteristics, and high elasticity characteristics.

FRP products have been prepared by a hand lay-up (HLU) method, a spray-up (SU) method, a preform matched melt die (Prf-MMD) method, a cold press (CP) method, a resin injection (RI) method, a sheet molding compound (SMC) method, a bulk molding compound (BMC) method, a vacuum bag method, a filament winding (FW) method and an autoclave (AC) method.

The filament winding method imparts remarkably excellent fiber reinforcing effect. In the other methods, the fiber is usually cut in short or the fiber is waved at crossing portions as a woven fabric and accordingly, the reinforcing effect resulting in excellent mechanical characteristics of the fiber is not satisfactorily attained. In accordance with the filament winding method, the continuous filaments under a wound condition are bonded in the fabrication. Therefore, the reinforcing characteristic of the filament is not deteriorated. In accordance with the filament winding method, the fiber density (Vf) can be remarkably high. This is one of the factors for high strength and high elasticity of FRP product.

The filament winding method is suitable for fabricating pipes or cylindrical or special products, however it is difficult to apply for fabricating a product having comprehensive configuration.

It has been known, as a process for preparing FRP product by the filament winding method, to produce the FRP product by winding a resin impregnated continuous filaments in the direction of 90 degree to the axis of a mandrel; cutting a semi-cured sheet on the mandrel to obtain a prepreg reinforced in one direction; and curing the prepreg by a vacuum bag method or an autoclave method. In this case, the filament layers are formed to give a desired thickness of the prepreg, however, there is no entanglement of the filaments between the layers and accordingly the layer peeling is disadvantageously caused. There is no entanglement of the filaments in one layer and accordingly, filament cracking is easily caused. Once, such defect is caused, the effect for preventing the growth of the defect is quite small.

On the other hand, the FRP products prepared by the filament winding method in the form of a cylindrical container or in the form of a prepreg laminated product have the remarkable anisotropic characteristics of strength and elasticity together with the effect of the reinforced filaments. Therefore, in the preparation of a pressure durable container by the filament winding method, the filaments are carefully wound in the various directions as the same direction and axial direction to reinforce it. On the other hand, the equal three directional reinforcing method has been considered for a prepreg lamination such as a plate.

The anisotropy of the prepreg laminated product in one direction has also been considered. As one example, a carbon fiber reinforced plastic prepared by the lamination in one direction has a strength in the filament direction of about 20 to 30 times the strength in the perpendicular direction. A carbon fiber reinforced plastic prepared by lamination in two directions of 0 degree and 90 degree has a strength of about 5 to 7 times the strength in the direction of 45 degree. A carbon fiber reinforced plastic prepared by the lamination in three directions 0 degrees, +60 degrees and −60 degrees has a strength substantially equal to the strength in the direction of 30 degrees. Thus, the one directional prepregs are reinforced in three directions to result in substantial isotropy. The product can be effectively used as parts or plates which should have uniform strength and elasticity.

The conventional laminated products obtained by arranging one directional prepregs in three directions have the aforementioned disadvantages of the layer peeling, the filament cracking and the low prevention of growth thereof and the other disadvantages caused by the layers of filaments in one direction. The laminated FRP products obtained by arranging one directional prepregs in three directions has a substantially isotropic property for a tensile stress but has anisotropic property for a bending stress. When the bending stress is applied, the maximum tensile strength and compression elasticity are given in the filament direction of the outer layer. In the FRP product, especially the FRP product having a thin thickness, there is a tendency for deformation around the axis of the filaments of the outer layer caused by a curing contraction or a thermal contraction of the resin as the impregnated matrix and accordingly, it has been difficult to form a precise flat or curved surface.

Moreover, the FRP prepared by the lamination of the one directional prepregs has disadvantageously inferior fabricatability. The fabrication of a product having a concavo-convex configuration or a large curvature has not been easy.

SUMMARY OF THE INVENTION

In accordance with the process of the present invention, a fiber reinforced plastic product is prepared by a step of winding a strand or rovings on a mandrel by a filament winding method in three directions of substantially +60 degrees, −60 degrees and 0 degrees to the axis of the mandrel in desired turns to form braid fabric reinforced in three directions; a step of impregnating a resin before or after the winding step; a step of cutting out the resin pregnated braid fabric from the mandrel to obtain a prepreg reinforced in three directions; and a step of fabricating the prepreg in a desired configuration for a product by heating.

DETAILED DESCRIPTION OF THE PREFERRED EMBODIMENTS

Figure 1:
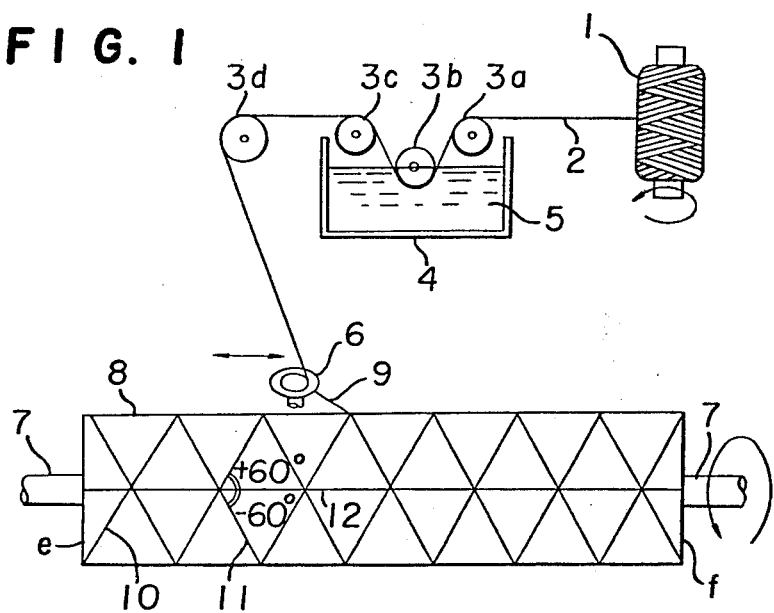
FIG. 1 is a diagram for a resin pregnating step and a filament winding step in the process of the present invention.

FIG. 1 shows a step of impregnation of a resin followed by a step of winding the impregnated filaments. Rovings (2) taken up from a bobbin (1) are impregnated with a resin (5) in a resin vessel (4) through rolls (3a), (3b), (3c) and are passed through the other roll (3d) and a fine guide of a traverse (6) to wind on a mandrel (8) turned by a shaft (7). The strand (9) passed through the traverse (6) to be wound on the mandrel (8) can be a roving or collected rovings after the impregnating step.

The winding step will be further discussed. The strand (9) is wound upon shifting the traverse (6) from the end (e) of the rotating mandrel (8) to the end (f) at an angle of +60 degrees to the axis of the mandrel as the strand (10). When the traverse (6) passes over the end (f), the traverse (6) is returned from the end (f) to the end (e) under the same rotation of the mandrel (8) whereby the strand is wound at an angle of −60 degrees to the axis (7) as the strand (11). The circuit from the start of the winding from the end (e) to the return to the end (e) is referred to as "a 60 degree winding circuit".

When the traverse (6) passes over the end (e), the rotation of the mandrel (8) is stopped and the traverse (6) is shifted to the end (f). When the traverse (6) passes over the end (f), the mandrel (8) is turned for a half turn and the mandrel (8) is stopped and the traverse (6) is shifted to the end (e) whereby the strand (9) are wound parallel to the axis (7) as the strand (12). When the traverse (6) passes over the end (e), the mandrel (8) is turned for a half turn. The circuit from the finish of the 60 degree winding circuit to the turn of the mandrel after passing the traverse (6) over the end (e) is referred to as "a parallel winding circuit". The strand after the parallel winding circuit is placed adjacent to the position of the strand at the start of the 60 degree winding circuit.

Figure 2:
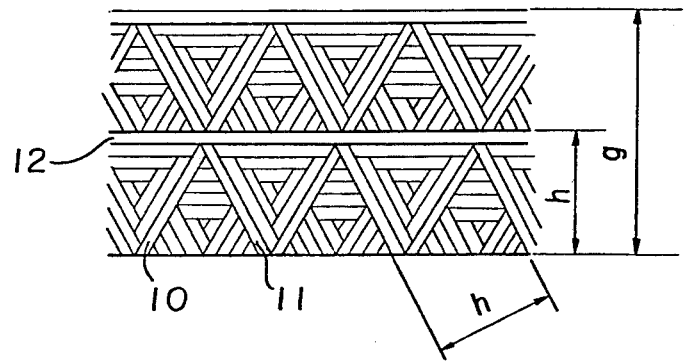
FIGS. 2 and 3 respectively are plane views of braid fabrics obtained in the filament winding step under the condition cutting out from the mandrel.

In the same operation as the 60 degree winding circuit, the strand is wound with a desired space and the same operation is repeated to wind the strand whereby the braid structure shown in FIG. 2 is formed. The desired interval is usually a value obtained by dividing ½ of a peripheral length of the mandrel by an integer n.

In FIG. 2, the reference (g) designates a peripheral length of the mandrel. The interval (h) of the strand in the same circuit but is half of the length (g). The braid pattern of alternation is referred to as a cross-over turn (herringbone stitch) which results in the prevention of the filament cracking and the layer peeling and the prevention of the growth of the peeling. The prepreg braid fabric is imparted with further superior fabricatability by slightly shifting the crossings at an angle of 60 degrees. In the braid pattern shown in FIG. 2, the fabricatability is superior depending upon smaller pattern of the base (h) of equilaterial triangle.

In order to provide the braid structure with superior fabricatability, the strand is repeatedly wound in pairs of the 60 degree winding circuit and the parallel winding circuit without being adjacent to the strand in the 60 degree winding circuit with a constant interval but being finally adjacent to the strand in the 60 degree winding circuit after the desired turns.

Figure 3:
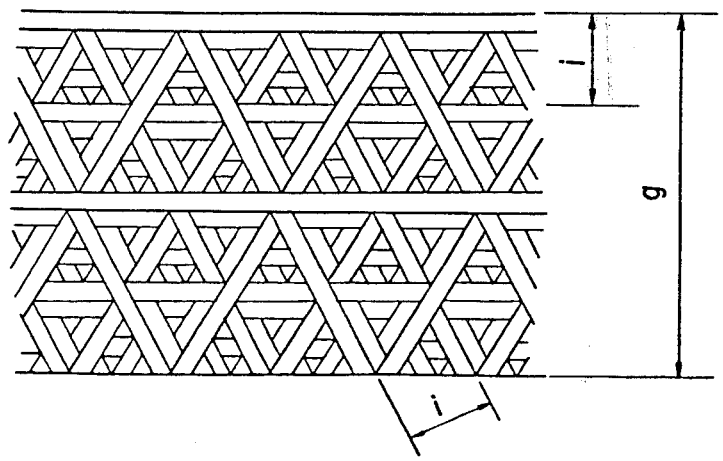

FIG. 3 shows one embodiment in which the interval (i) is ¼ of the peripheral length of the mandrel.

Figure 4:
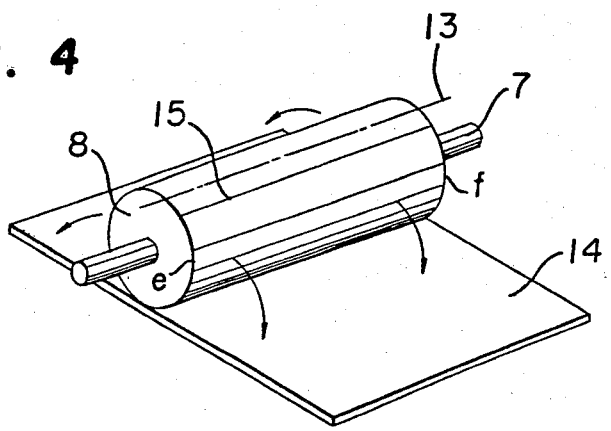
FIG. 4 is a schematic view showing the step of cutting out the prepreg from the mandrel.

FIG. 4 is a view of the braid fabric (14) prepared by turning at the desired turns and being cut out along the line (13) parallel to the axis (7) and the ends (e), (f). When the resin impregnating step is provided before the winding step, it is preferable to coat a partitioning agent or to form a partitioning film layer on the mandrel (8) since the cutting of the braid fabric (14) is easily performed. The resin impregnated in the cutting step is preferable to maintain in B-stage (semicured condition) in view of the processing and the following fabricating operation.

Therefore, a resin used for the impregnation is selected from the resins which are formed into B-stage at relatively low temperature and are not easily formed in gel at room temperature.

When the resin impregnating step is not provided before the winding step, the braid fabric is impregnated with a resin on the mandrel before cutting out or after cutting out to prepare a prepreg.

Figure 5:
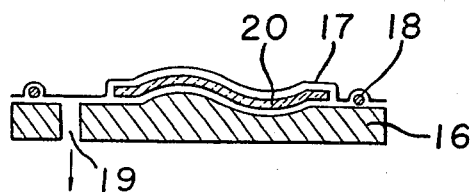
FIG. 5 is a sectional view showing the step of fabricating the cut prepreg.

FIG. 5 shows a vacuum bag method as one embodiment for cutting a prepreg (20) taken out of the mandrel (8) in a pattern of a mold (16) and molding and curing the prepreg. The prepreg (20) is sucked by a vacuum pump through holes (19) on the film (17) sealed by the sealant (18) in vacuum whereby the prepreg is pressed under atmospheric pressure. The whole parts are put in a heating device such as an oven or the heater is equipped in the mold (16) whereby the prepreg is heated, to mold it in the cured form. Finally, the product is separated from the mold, and the process for preparing the product is attained. Of course, the vacuum bag method is only one embodiment for fabrication and the other methods such as AC method and Prf-MMD method can be also applied.

Figure 6:
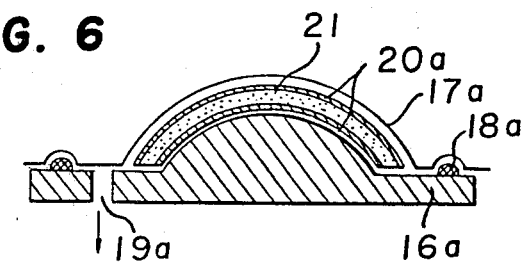
FIG. 6 is a sectional view showing the step of fabricating the cut prepreg having a sandwich structure.

Referring to FIG. 6, a product having a sandwiched structure having FRP sheets on both surfaces of a light weight core prepared by the process of the present invention will be illustrated.

In FIG. 6, the reference (16a) designates a mold for fabrication; (17a) designates a film; (18a) designates a sealant; (19a) designates holes for suction; (20a) designates a prepreg prepared by the process of the present invention; (21) designates a light weight core made of a metallic honeycomb or a foamed resin. FIG. 6 shows the vacuum bag method as one embodiment of the step of bonding the prepregs (20a) on the light weight core (21). The prepregs (20) are placed on both surfaces of the light weight core (21) and they are placed on the mold (16) which is sucked by the vacuum pump through the holes (19) on the film (17) sealed by the sealant (18) to closely contact under the pressure. The whole part is put in the heating device or the heater is equipped in the mold (16) to heat the prepregs. The prepregs are fabricated and cured and then, the product is separated from the mold to obtain the product.

The product having the sandwiched structure shown in FIG. 6 can be fabricated by the other methods. The prepregs (20a) can be cured in the configuration corresponding to the both surfaces of the product and can be bonded on the both surface of the light weight core (21) with a binder. A foamable resin can be injected between the cured products having the desired configuration of the sandwiched structure.

Figure 7:
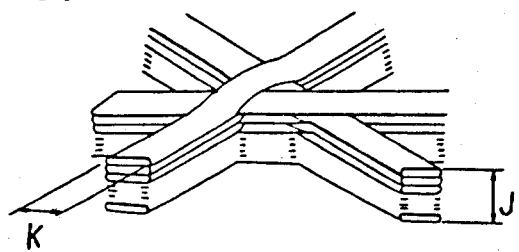
FIG. 7 is a schematic view of a part of a braid fabric formed by pilling up in a desired thickness.

FIG. 7 shows a part of a braid fabric formed by winding the strand in a desired thickness in three directions.

The strand wound in one direction is crossed to the strands in two other directions in the braiding. The braid fabric is formed at the same positions in the desired thickness. One embodiment of the plied braid fabrics is shown in FIG. 7 wherein the reference J designates a thickness of the filaments and rovings; and the reference K designates a width. The resulting braid fabric has a light weight and excellent fabricatability because of the stitch hole effects.

In accordance with the present invention, a high strength characteristic and high elastic characteristic results from the special fiber reinforcing effect by the filament winding method. The strands in three directions are bonded to maintain the filaments in a vertical direction, whereby filament cracking does not easily occur. Even though it does occur, the prevention of the growth of the cracking is effected. The layers are not formed as the laminated product, and accordingly, the layer peeling is not caused. Under the prepreg condition, the fabricatability is superior to that of the laminated one directional prepregs. A product having a large curvature and a comprehensive configuration can be easily fabricated. In the product prepared by the process of the present invention, the filaments are arranged in three directions at an angle of 60 degree and accordingly, the product has excellent isotropic characteristic in all directions to the bending stress.

The fibers for the strand can be glass fiber, carbon fiber and synthetic fibers such as polyamide, polyester and polyolefin fibers.

The resins for impregnation can be epoxy resins, polyimide resins and polyesters.

The volumetric ratio of the fiber is usually in a range of 50 to 70%.

The detail of the fibers and the resins in the prepregs are known in the field of prepregs for electric parts.

We claim:

1. A process for preparing a fiber reinforced plastic product which comprises:

filament winding a strand or rovings on a mandrel in three directions of substantially +60 degrees, −60 degrees and 0 degrees to the axis of the mandrel in desired turns to form braid fabric reinforced in three directions;

impregnating a resin before or after the winding step;

cutting out the resin pregnated braid fabric from the mandrel to obtain a prepreg reinforced in three directions; and fabricating the prepreg in a desired configuration for a product by heating wherein a traverse is utilized and said winding step further comprises winding a strand at an angle of +60 degrees by shifting said traverse in a first direction from a first end to a second end of said mandrel while rotating said mandrel; winding the strand at an angle of −60 degrees by shifting the traverse in a second direction opposite said first direction from the second end to the first end after passing said traverse over the second end of said mandrel while rotating; stopping rotating of said mandrel; shifting said traverse from the first end; turning said mandrel half a turn and shifting said traverse from the second end to the first end after passing said traverse over the second end; and turning said mandrel half a turn to the original position after passing said traverse over the first end and again winding with an interval from the original position.

2. The process to claim 2 wherein the interval between the original starting position and the next starting position is a value determined by dividing ½ of a peripheral length of said mandrel by an integer n.

3. The process according to claim 1 which further comprises crossing said strand wound in one direction only to the strand wound in two directions in the winding step.

4. The process according to claim 1 which further comprises crossing said strand wound in one direction to the strand wound in two directions and repeating the winding to provide a predetermined thickness.

* * * * *